(12) United States Patent
Hoetzel

(10) Patent No.: US 6,800,831 B1
(45) Date of Patent: Oct. 5, 2004

(54) METHOD AND DEVICE FOR RAPID CUTTING OF A WORKPIECE FROM A BRITTLE MATERIAL

(75) Inventor: Bernd Hoetzel, Woerrstadt (DE)

(73) Assignee: Schott Glas, Mainz (DE)

(*) Notice: Subject to any disclaimer, the term of this patent is extended or adjusted under 35 U.S.C. 154(b) by 0 days.

(21) Appl. No.: 10/111,237

(22) PCT Filed: Oct. 27, 2000

(86) PCT No.: PCT/EP00/10577

§ 371 (c)(1),
(2), (4) Date: Jul. 19, 2002

(87) PCT Pub. No.: WO01/32349

PCT Pub. Date: May 10, 2001

(30) Foreign Application Priority Data

Oct. 29, 1999 (DE) .......................................... 199 52 331

(51) Int. Cl.[7] .............................................. B23K 26/00
(52) U.S. Cl. ............................. 219/121.72; 219/121.67
(58) Field of Search ...................... 219/121.72, 121.67, 219/121.84, 121.85

(56) References Cited

U.S. PATENT DOCUMENTS

| | | | | |
|---|---|---|---|---|
| 3,453,097 A | * | 7/1969 | Hafner | .......................... 65/112 |
| 3,885,943 A | * | 5/1975 | Chui | ................................ 65/97 |
| 3,935,419 A | * | 1/1976 | Lambert et al. | ........ 219/121.67 |
| 4,467,168 A | * | 8/1984 | Morgan et al. | ......... 219/121.67 |
| 4,993,230 A | | 2/1991 | Hingst | |
| 5,237,150 A | | 8/1993 | Karube | |
| 5,254,833 A | * | 10/1993 | Okiyama | ............... 219/121.68 |
| 5,747,818 A | | 5/1998 | Cecere | |
| 5,776,220 A | * | 7/1998 | Allaire et al. | ................... 65/112 |
| 5,830,208 A | | 11/1998 | Muller | |
| 5,918,468 A | | 7/1999 | Cassells et al. | |
| 5,968,382 A | | 10/1999 | Matsumoto et al. | |
| 5,984,159 A | * | 11/1999 | Ostendarp et al. | ......... 225/93.5 |

FOREIGN PATENT DOCUMENTS

| | | |
|---|---|---|
| DE | 1 244 346 | 7/1967 |
| DE | 43 05 107 A1 | 8/1994 |
| DE | 44 11 037 | 10/1994 |
| EP | 0 062 482 A1 | 10/1982 |
| EP | 0 872 303 A2 | 10/1998 |
| GB | 1 433 463 | 4/1976 |
| GB | 1433563 | * 4/1976 |
| WO | WO 93/20015 | * 10/1993 |
| WO | 96/20062 | 7/1996 |

* cited by examiner

Primary Examiner—M. Alexandra Elve
(74) Attorney, Agent, or Firm—Michael J. Striker

(57) ABSTRACT

The method for rapid cutting of a workpiece made of brittle material along a predetermined cutting line of any desired shape includes generating laser beams, preferably with a CO or $CO_2$ laser; focusing the laser beams onto the cutting line to form focused laser beams on the cutting line; guiding the focused laser beams one behind the other along the cutting line without melting the brittle material; shaping the respective laser beams so that the respective beam cross-sections forming corresponding focal spots on a surface of the workpiece have predetermined shapes and intensity distributions; moving the workpiece and the laser beams relative to each other along the cutting line so that the focused laser beams induce a thermo-mechanical stress in the brittle material and blowing a fluid cooling medium, such as cold air or an air/water mixture, onto a heated cutting line section of the workpiece for subsequent cooling so as to increase the thermo-mechanical stress in the brittle material above its breaking strength.

24 Claims, 2 Drawing Sheets

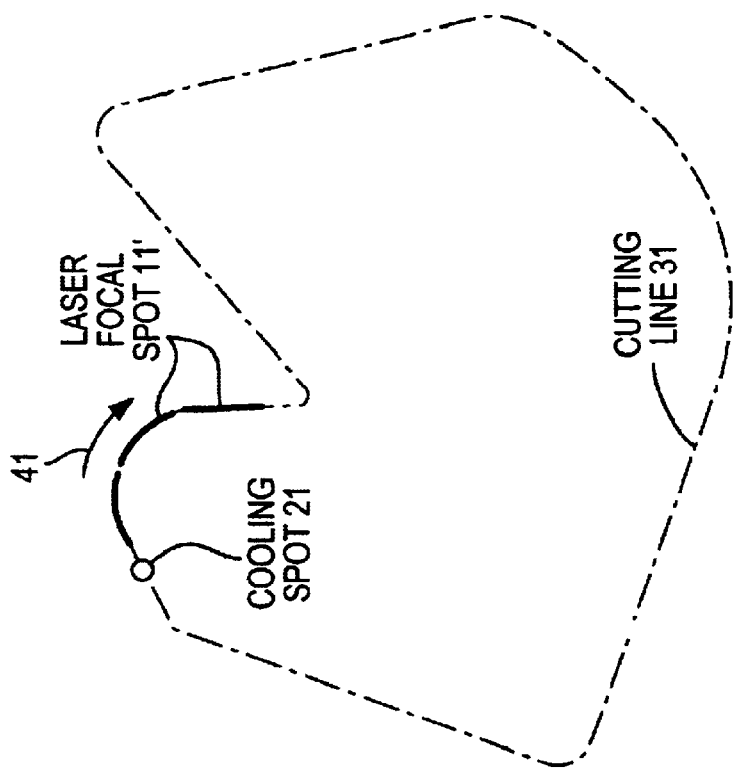
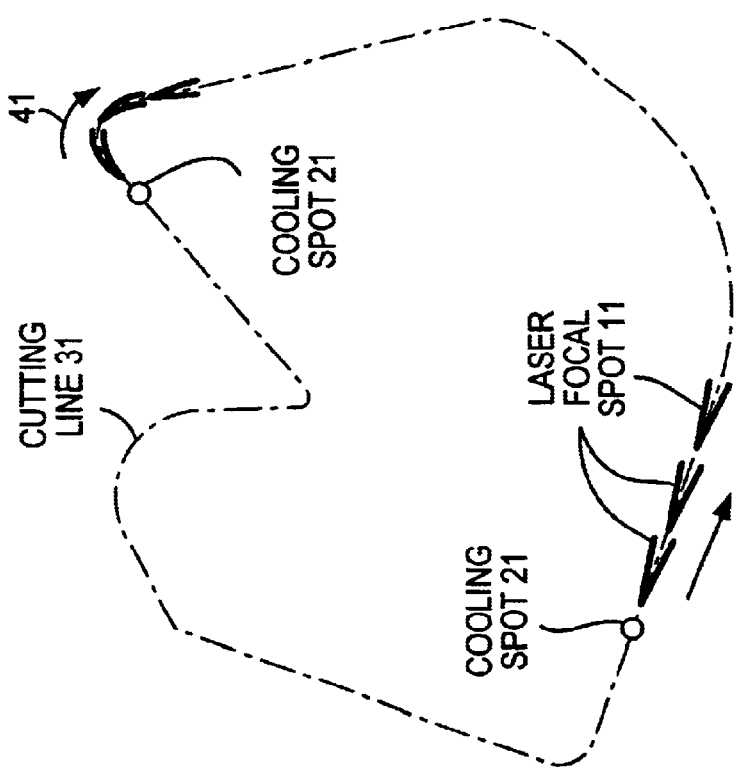

METHOD AND DEVICE FOR RAPID CUTTING OF A WORKPIECE FROM A BRITTLE MATERIAL

BACKGROUND OF THE INVENTION

1. Field of the Invention

The invention relates to a method and a device for the rapid cutting of a workpiece made from brittle material, in particular made from glass, glass-ceramic or ceramic, by means of laser beams along a cutting line of any desired contour. A preferred application is he rapid cutting of flat glass.

2. Description of the Related Art

Conventional methods for cutting glass are based on using a diamond or a small cutting wheel first of all to produce a score in the glass, in order for the glass then to be broken along the weakened line generated in this way by the application of an external mechanical force. A drawback of these methods is that the score causes particles (splinters) to be detached from the surface, and these particles can be deposited on the glass, where they may, for example, cause scratches. Also, chips may form at the cut edge, leading to an uneven glass edge. Furthermore, the microcracks in the cut edge which form during the scoring operation lead to a reduced mechanical load-bearing capacity, i.e. to an increased risk of breaking.

One approach aimed at avoiding both splinters and chips and microcracks is to separate glass using thermally generated stress. In this case, a heat source which is directed onto the glass is moved at a fixed velocity relative to the glass, and in this way generates a thermal stress which is so high that the glass forms cracks. The required property of the heat source of being able to position the thermal energy locally, i.e. with an accuracy of better than one millimeter, which corresponds to typical cutting accuracy, is satisfied by infrared radiators, special gas burners, and in particular lasers. On account of their good focussing properties, good controllability of the power and the possibility of beam shaping and therefore intensity distribution, lasers have proven successful and achieved widespread use on glass.

This laser-beam cutting method, which induces a thermomechanical stress to above the breaking strength of the material by local heating by means of the focussed laser beam in combination with external cooling, has been disclosed by a number of documents.

The method which is known from WO 93/20015 uses a laser beam of elliptical shape with a trailing cooling spot. This method achieves good results in straight-line scoring of nonmetallic plate material, but is unable to ensure high-quality and highly accurate scoring along a curved contour. Moreover, the known method does not achieve a very stable cutting profile at a high radiation density and high cutting speeds.

To optimize the heating conditions of the material along the cutting line, according to WO 96/20062 the heating is effected by means of a bundle of heating beams, in the cross section of which passing through the center of the bundle the density of the radiation power is distributed so that it decreases from the periphery toward the center. An elliptical beam bundle is used, resulting in temperature distribution in the form of an elliptical ring.

The drawbacks of these known methods are avoided by the method described in EP 0 872 303 A2, which provides a focal spot which has a U-shaped or V-shaped contour which opens out in the cutting direction and a characteristic intensity distribution. This method has proven successful in practice when carrying out straight cuts. It is possible to cut through even large workpiece thicknesses cleanly. When carrying out free-form cuts, i.e. cuts with any desired contour, possibly including a curved contour, it is necessary to generate a curved U-shaped or V-shaped intensity distribution which is matched to the contour of the cutting line and for the contour to be tracked, including the subsequent cooling. This requires in particular coupling of the scanner device which generates the focal spot with a path control unit, which entails a not inconsiderable control and adjustment outlay.

DE 44 11 037 C2 has disclosed a laser-beam cutting method for cutting hollow glasses which operates with a stationary laser beam which is sharply focussed to form a spot and generates a thermal stress zone around the rotating hollow glass. Then, cooling is effected along the stress zone which has been introduced over the entire periphery of the hollow glass using a mist of atomized water which is blown out of a nozzle, so that the hollow glass edge is severed when used in conjunction with a mechanically or thermally generated starting crack.

DE 43 05 107 A1 has disclosed a laser-beam cutting method in which the laser beam is shaped in such a way that its beam cross section, on the surface of the workpiece, is elongate in shape, in which method the ratio of length and width of the impinging beam cross section can be set by means of a diaphragm in the laser-beam path.

Furthermore, methods for cutting glass by means of a plurality of laser beams are known.

In the method described in DE-B 1 244 436, inter alia to produce shaped edges, more than one laser beam is applied to the same cut during the laser cutting, and the individual laser beams form different angles with the glass surface. The corresponding U.S. Pat. No. 3,453,097 describes a method for cutting glass by means of a plurality of laser beams guided in coupled form onto the cutting line.

For a very wide range of reasons, the first laser-beam cutting method described has proven to be the superior method and has become widely accepted in practice. The invention is based on this method. The cutting capacity which can be achieved by the first method described and the usability of the method are governed in particular by the effective induction of a thermomechanical stress along the cutting line in the workpiece which is to be cut, the intensity distribution in the laser beam and the type of cooling. The rapid and, at the same time, effective induction of a thermomechanical stress along the cutting line which is required for cutting is only ensured to an insufficient extent in the known methods. On account of the ineffective induction of a thermomechanical stress, limits are imposed on the demand for ever higher cutting speeds.

SUMMARY OF THE INVENTION

It is an object of the present invention to provide a method and a device for cutting a workpiece made from brittle material, in particular made from glass, glass-ceramic or ceramic, by means of laser beams along a predetermined cutting line of any desired contour, so that a high cutting accuracy and faithfulness to contours and rapid cutting are possible without the formation of microcracks, chips or splinters.

This object is attained, according to the invention, by a method for rapid cutting of a workpiece made of brittle material along a predetermined cutting line of any desired shape by means of laser beams, which comprises:

a) generating the laser beams;
b) focusing the laser beams onto the cutting line to form focused laser beams on the cutting line;
c) guiding the focused laser beams one behind the other along the cutting line without melting the brittle material;
c) shaping the respective laser beams so that the respective beam cross-sections forming corresponding focal spots on a surface of the workpiece which is to be cut have predetermined shapes and intensity distributions;
d) moving the workpiece and the laser beams relative to each other so that the focal spots move along the cutting line and the focused laser beams induce a thermo-mechanical stress in the brittle material; and
e) blowing a fluid cooling medium onto a heated cutting line section of the workpiece for subsequent cooling so as to increase the thermo-mechanical stress in the brittle material above a breaking strength of the brittle material.

Clean cut edges are achieved, without any microcracks, chips or splinters.

The method according to the invention allows rapid and effective inducing of a thermomechanical stress along a cutting line of any desired contour. Surprisingly, it has been found that high laser powers can be introduced into the workpiece to be cut without the workpiece melting. At the same time, it was possible to increase the cutting speed by up to 100% compared to previous methods.

In this way, it is readily possible to achieve cutting speeds of up to 200 m/min.

Particularly in order to introduce high laser powers into the workpiece without the workpiece being melted at the same time, it is advantageous for the laser beams which are guided in coupled form, and in particular in parallel, to be guided onto the cutting line one behind the other. In this case, it is possible for the laser beams to be guided in quick succession one behind the other or for the laser beams to be guided onto the cutting line in completely or partially superimposed form.

The respective laser beams are in this case preferably shaped in such a manner that the beam cross sections acting as focal spots on the surface of the workpiece to be cut in each case correspond to the same shape and the same intensity distribution.

Furthermore, the laser beams are preferably guided onto the cutting line parallel to one another, perpendicular or at least at the same angle to the workpiece surface.

When cutting glass, it should be ensured in particular that the transformation temperature $T_G$ of the respective glass is not exceeded.

If a microcrack is made at the start of the cutting line, the crack follows the cutting line very precisely.

It is preferable for the respective laser beams to be beams of one or more CO or $CO_2$ lasers, the wavelength of the laser particularly preferably being tunable, so that it can be matched to the corresponding absorption maximum of the material which is to be cut. The more successfully the laser wavelength can be matched to the absorption maximum of the material to be cut, the more effective the induction of a thermomechanical stress and also the higher the cutting speed which can be selected.

The fluid cooling medium is preferably blown onto the workpiece from the top downward.

Preferred fluid cooling media are cooling gases, preferably cold air, or a water/air mixture.

In a preferred embodiment of the invention, the temperature of the fluid cooling medium is set and controlled. In this case, it is particularly preferable for the fluid cooling medium to be additionally cooled. This can be achieved, for example, by means of at least one Peltier element. This allows reproducible process management under conditions which can be controlled and monitored.

In a further configuration of the invention, the gas jet is shaped by one or more concentric and/or elliptical nozzles.

It is possible to use all gas-jet shapes and nozzle arrangements which allow effective cooling.

In principle, all predetermined laser-beam shapes and associated intensity distributions can be applied to the workpiece which is to be cut.

A U-shaped or V-shaped contour of the laser beam and the associated intensity distribution, as described in EP 0 872 303 A2, is particularly preferred.

Furthermore, the CO or $CO_2$ laser, like any other laser which is sufficiently strongly absorbed by the material, is suitable for the subsequent fusion and rounding of the edge which is broken off as a sharp edge.

The method according to the invention is particularly suitable for cutting brittle materials comprising glass, glass-ceramic or ceramic; it is advantageously possible to cut even relatively thick materials, for example flat glass with a thickness of 30 mm.

With regard to the device for the rapid cutting of a workpiece made from brittle material by means of laser beams along a predetermined cutting line of any desired contour, the following are provided:

one or more laser sources for generating laser beams, optical means for the coupled guidance of the laser beams focussed onto the cutting line, without melting the material, means for shaping the respective laser beams in such a manner that the beam cross section acting as a focal spot on the surface of the workpiece to be cut corresponds to a predetermined shape and intensity distribution, at least one drive arrangement for generating a relative movement between the laser beams and the workpiece along the cutting line, with a thermomechanical stress being induced, and means for blowing on a fluid cooling medium for subsequent cooling of the heated cutting-line section, so that the thermomechanical stress is increased to above the breaking strength of the material.

According to a first embodiment, the optical means for coupled and in particular parallel guidance of the laser beams allow coupled guidance of the laser beams onto the cutting line in focused form and one behind the other. In this case, it is possible for the optical means for the coupled guidance of the laser beams to allow coupled guidance of the laser beams in such a manner that the laser beams are guided onto the cutting line in focused form and separately from one another or, alternatively, completely or partially superimposed.

Furthermore, it is preferable to provide means for forming a microcrack at the start of the cutting line.

The laser is preferably a $CO_2$ laser, the wavelength of which corresponds to the spectral absorption maximum of the material which is to be cut. This $CO_2$ laser emits light in the far infrared region at a wavelength of 10.6 $\mu$m. This thermal radiation has significant particular features when acting on material. For example, it is highly absorbed by most materials which are transparent in visible light.

The fact of high absorption in glass is used to cut glass. At an absorption coefficient of $10^3$ cm$^{-1}$, 95% of the power is absorbed in a 30 $\mu$m thick layer.

If materials whose absorption maxima lie at a wavelength of approximately 5 μm are to be cut, it is recommended to use a CO laser as the source.

In principle, it is possible to use all predetermined means for generating, shaping and guiding a laser beam which are suitable for inducing a thermomechanical stress below the melting temperature of the workpiece which is to be cut.

According to a further embodiment, the gas jet for blowing clear that part of the surface of the workpiece on which the laser beam impinges is an air jet.

BRIEF DESCRIPTION OF THE DRAWING

The objects, features and advantages of the invention will now be illustrated in more detail with the aid of the following description of the preferred embodiments, with reference to the accompanying figures in which:

FIG. 1 is a diagram showing a first embodiment of a method of rapidly cutting a brittle workpiece, for example made of glass, along a predetermined cutting line:

FIG. 2 is a diagram showing a second embodiment of a method of rapidly cutting a brittle workpiece, for example made of glass, along a predetermined cutting line.

As shown in FIGS. 1 and 2, for rapid cutting of a workpiece made from brittle material by means of laser beams along a predetermined cutting line 31 of any desired contour (indicated by alternating dashes and dots), in each case three laser beams are generated (step 1, FIG. 3), which are focused with coupled guidance onto the cutting line, without the material being melted (steps 2 and 3, FIG. 3). The laser beams are preferably guided perpendicular to the surface of the material. The laser beams are shaped in such a manner that the respective beam cross section, which acts as a focal spot 11 on the surface of the workpiece to be cut, corresponds to a predetermined shape and intensity distribution (step 4, FIG. 3). According to FIG. 1. the respective beam cross section has a V-shaped contour and the associated intensity distribution. In the embodiment shown in FIG. 2, the respective beam cross section acting as a focal spot 11', by contrast, has a linear contour.

Figure 3:
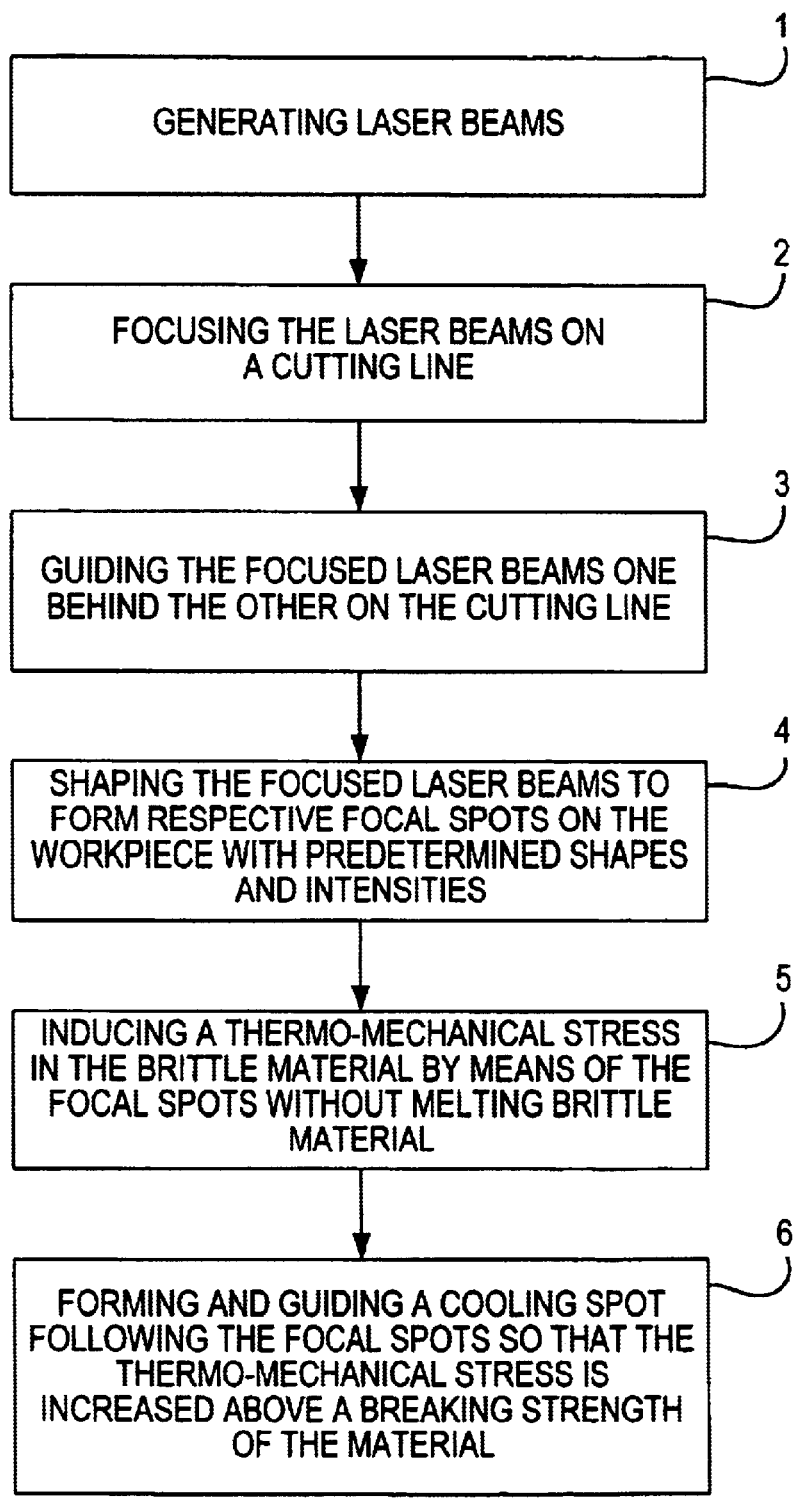
FIG. 3 is a flow chart showing the steps of the method for rapid cutting of a workpiece made of brittle material according to the invention.

By generating a relative movement between the three coupled laser beams and the workpiece along the cutting line (in the direction of the arrow 41), a thermomechanical stress is induced in the workpiece (step 5, FIG. 3). It is essential for the parallel coupled laser beams to follow the predetermined cutting line 31 as accurately as possible. Following the laser beams, as a result of a fluid cooling medium being blown on for subsequent cooling (cooling spot 21) of the heated cutting-line section, the thermomechanical stress is increased to above the breaking strength of the material (step 6, FIG. 3).

The three parallel laser beams are guided simultaneously, preferably one behind the other, onto the cutting line.

What is claimed is:

1. A method for rapid cutting of a workpiece along a predetermined cutting line of any desired shape by means of laser beams, said workpiece being made of brittle material, said method comprising the steps of:

a) generating the laser beams;

b) focusing the laser beams onto the cutting line to form focused laser beams on the cutting line;

c) guiding the focused laser beams one behind the other along the cutting line without melting the brittle material;

d) shaping the respective laser beams so that respective beam cross-sections forming corresponding focal spots on a surface of the workpiece have predetermined shapes and intensity distributions;

e) moving the workpiece and the laser beams relative to each other so that the focal spots move along the cutting line and the focused laser beams induce a thermomechanical stress in the brittle material without melting the brittle material; and f) guiding a cooling spot, which is produced by blowing a fluid cooling medium onto a heated cutting line section of the workpiece, along the cutting line following said focal spots so that said cooling spot increases said thermo-mechanical stress produced by the focused laser beams in the brittle material above a breaking strength of the brittle material.

2. The method as defined in claim 1, wherein during the guiding of the laser beams along the cutting line the focused laser beams are completely or partially superimposed onto the cutting line.

3. The method as defined in claim 1, wherein a microcrack is formed at a starting part of the cutting line.

4. The method as defined in claim 1, wherein the generating of the laser beams is performed by a CO or $CO_2$ laser.

5. The method as defined in claim 1, wherein the generating of the laser beams is performed by tunable lasers.

6. The method as defined in claim 1, wherein the blowing of the fluid cooling medium occurs from above down onto the workpiece.

7. The method as defined in claim 1, wherein the fluid cooling medium is a cooling gas.

8. The method as defined in claim 7, wherein said cooling gas is cold air.

9. The method as defined in claim 1, wherein the fluid cooling medium is a mixture of air and water.

10. The method as defined in claim 1, further comprising setting and controlling a temperature of the fluid cooling medium.

11. The method as defined in claim 1, further comprising cooling the fluid cooling medium.

12. The method as defined in claim 11, wherein the cooling of the fluid cooling medium is performed by means of a Peltier element.

13. A device for rapid cutting of a workpiece along a predetermined cutting line of any desired shape by means of laser beams, said workpiece being made of brittle material, said device comprising:

laser means for generating the laser beams, said laser means comprising at least one laser source;

optical means for focusing the laser beams onto the cutting line to form focused laser beams on the cutting line;

optical means for guiding the focused laser beams one behind the other along the cutting line without melting the brittle material;

means for shaping the respective laser beams so that respective beam cross-sections forming corresponding focal spots on a surface of the workpiece have predetermined shapes and intensity distributions;

drive means for moving the workpiece and the laser beams relative to each other along the cutting line so that the focal spots move along the cutting line and the focused laser beams induce a thermo-mechanical stress in the brittle material without melting the brittle material; and means for blowing a fluid cooling medium onto a heated cutting line section of the workpiece to form a cooling spot; and means for guiding said cooling spot along said cutting line following said focal spots so that said cooling spot increases said thermo-mechanical stress produced by the focused laser beams in the brittle material above a breaking strength of the brittle material.

14. The device as defined in claim 13, wherein the optical means for guiding of the focused laser beams along the cutting line guides the focused laser beams so that the focused laser beams are completely or partially superimposed onto the cutting line.

15. The device as defined in claim 13, further comprising means for making a microcrack at a starting part of the cutting line.

16. The device as defined in claim 13, wherein the laser means for generating the laser beams comprises a CO laser or a $CO_2$ laser.

17. The device as defined in claim 13, wherein the laser means for generating the laser beams comprises at least one tunable laser.

18. The device as defined in claim 13, wherein said means for blowing the fluid cooling medium blows the cooling medium from above down onto the workpiece.

19. The device as defined in claim 13, wherein said means for blowing the fluid cooling medium comprises means for blowing a cooling gas onto the workpiece.

20. The device as defined in claim 13, wherein said means for blowing the fluid cooling medium comprises means for blowing cold air onto the workpiece.

21. The device as defined in claim 13, wherein said means for blowing the fluid cooling medium comprises means for blowing a mixture of air and water onto the workpiece.

22. The device as defined in claim 13, further comprising means for setting and controlling a temperature of the fluid cooling medium.

23. The device as defined in claim 13, further comprising means for cooling the fluid cooling medium.

24. The device as defined in claim 23, wherein the means for cooling of the fluid cooling medium comprises a Peltier element.

* * * * *